(12) United States Patent
De La Cal et al.

(10) Patent No.: US 11,613,081 B2
(45) Date of Patent: Mar. 28, 2023

(54) BUILD MATERIAL MANAGEMENT

(71) Applicant: Hewlett-Packard Development Company, L.P., Spring, TX (US)

(72) Inventors: Gabriel De La Cal, Sant Cugat del Val (ES); Pablo Dominguez Pastor, Sant Cugat del Valles (ES); Pau Martin Vidal, Sant Cugat del Valles (ES); Anna Torrent, Sant Cugat del Valles (ES); Albert Mora Murciano, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 780 days.

(21) Appl. No.: 16/316,154

(22) PCT Filed: Sep. 29, 2016

(86) PCT No.: PCT/US2016/054346
§ 371 (c)(1),
(2) Date: Jan. 8, 2019

(87) PCT Pub. No.: WO2018/063217
PCT Pub. Date: Apr. 5, 2018

(65) Prior Publication Data
US 2021/0291454 A1 Sep. 23, 2021

(51) Int. Cl.
*B29C 64/336* (2017.01)
*B33Y 40/00* (2020.01)
(Continued)

(52) U.S. Cl.
CPC .......... *B29C 64/336* (2017.08); *B29C 64/329* (2017.08); *B29C 64/393* (2017.08);
(Continued)

(58) Field of Classification Search
CPC ... B29C 64/336; B29C 64/329; B29C 64/393; B33Y 10/00; B33Y 30/00; B33Y 40/00; B33Y 50/02
See application file for complete search history.

(56) References Cited

U.S. PATENT DOCUMENTS 5,258,146 A * 11/1993 Almquist ............ G01F 23/2921
264/401
8,185,229 B2   5/2012 Davidson
(Continued)

FOREIGN PATENT DOCUMENTS

CN           1857930 A      11/2006
CN        102266942 A       12/2011
(Continued)

OTHER PUBLICATIONS

Varia 3D, Inc., "How Does Varia 3D Laser Sintering Technology Work?", May 23, 2016, 7 pages, < http://varia3d.com/techonlogy/laser-sintering/.

*Primary Examiner* — Larry W Thrower
(74) *Attorney, Agent, or Firm* — Shook, Hardy & Bacon L.L.P.

(57) ABSTRACT

A material management apparatus for an additive manufacturing system comprises a build material supply system to supply build material to a building area for building an object by additive manufacturing. The build material supply system includes a first build material supply unit to supply build material from a first side of a building area and a second build material supply unit to supply build material from a second side of the building area, the second side opposing the first side. The material management apparatus also includes a controller to control the build material supply system to vary an amount of build material to be supplied via the first build material supply unit based on a detected difference between a first amount of material available for
(Continued)

supply via the first build material supply unit and a second amount of material available for supply via the second build material supply unit.

15 Claims, 8 Drawing Sheets

(51) Int. Cl.
    *B29C 64/329*     (2017.01)
    *B29C 64/393*     (2017.01)
    *B33Y 10/00*     (2015.01)
    *B33Y 30/00*     (2015.01)
    *B33Y 50/02*     (2015.01)

(52) U.S. Cl.
    CPC ............... *B33Y 40/00* (2014.12); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 8,545,209 B2 | 10/2013 | Shi et al. |
| 8,888,480 B2 | 11/2014 | Yoo et al. |
| 2002/0145213 A1 | 10/2002 | Liu et al. |
| 2005/0280185 A1 | 12/2005 | Russell et al. |
| 2008/0047628 A1* | 2/2008 | Davidson ............... B33Y 40/00 141/18 |
| 2018/0021855 A1* | 1/2018 | De Lajudie ............. B22F 12/00 419/26 |

FOREIGN PATENT DOCUMENTS

| | | | |
|---|---|---|---|
| CN | 104191616 A | 12/2014 | |
| CN | 204451214 U | 7/2015 | |
| RU | 2535704 C1 | 12/2014 | |
| WO | WO-2016131785 A1 * | 8/2016 | ............. B33Y 40/00 |

\* cited by examiner

BUILD MATERIAL MANAGEMENT

CROSS-REFERENCE TO RELATED APPLICATION

Pursuant to 35 U.S.C. § 371, this application is a United States National Stage Application of International Patent Application No. PCT/US2016/054346, filed on Sep. 29, 2016, the contents of which are incorporated by reference as if set forth in their entirety herein.

BACKGROUND

Additive manufacturing process may be used to form three-dimensional objects. In one example of additive manufacturing, an object may be generated by solidifying portions of layers of build material. In examples, the build material may be in the form of a powder, liquid or slurry. Build material may be stored in a build material supply unit. A supply of build material in a build material supply unit may be replenished before it runs out, or the build material supply unit may be replaced.

BRIEF DESCRIPTION OF THE DRAWINGS

Various features and advantages of the present disclosure will be apparent from the detailed description which follows, taken in conjunction with the accompanying drawings, which together illustrate, by way of example, features of the present disclosure, and wherein.

DETAILED DESCRIPTION

Three-dimensional objects can be generated using additive manufacturing techniques. The objects may be generated by solidifying portions of successive layers of build material. The build material can be powder-based and the material properties of generated objects may be dependent on the type of build material and the type of solidification. In some examples, solidification of the powder material is enabled using a liquid fusing agent. In other examples, solidification may be enabled by temporary application of energy to the build material. In certain examples, fuse and/or bind agents are applied to build material, wherein a fuse agent is a material that, when a suitable amount of energy is applied to a combination of build material and fuse agent, causes the build material to fuse and solidify. In other examples, other build materials and other methods of solidification may be used. In certain examples, the build material includes paste material, slurry material or liquid material. This disclosure describes examples of build material management apparatuses (such as build material management stations or build material preparation apparatuses) for managing build material.

Examples of build materials for additive manufacturing include polymers, crystalline plastics, semi-crystalline plastics, polyethylene (PE), polylactic acid (PLA), acrylonitrile butadiene styrene (ABS), amorphous plastics, Polyvinyl Alcohol Plastic (PVA), Polyamide (e.g., nylon), thermo (setting) plastics, resins, transparent powders, colored powders, metal powder, ceramics powder such as for example glass particles, and/or a combination of at least two of these or other materials wherein such combination may include different particles each of different materials or different materials in a single compound particle. Examples of blended build materials include alumide, which may include a blend of aluminum and polyamide, multi-color powder, and plastics/ceramics blends. There exist more build materials and blends of build materials that can be managed by an apparatus of this disclosure and that are not mentioned in this disclosure.

Figure 1:
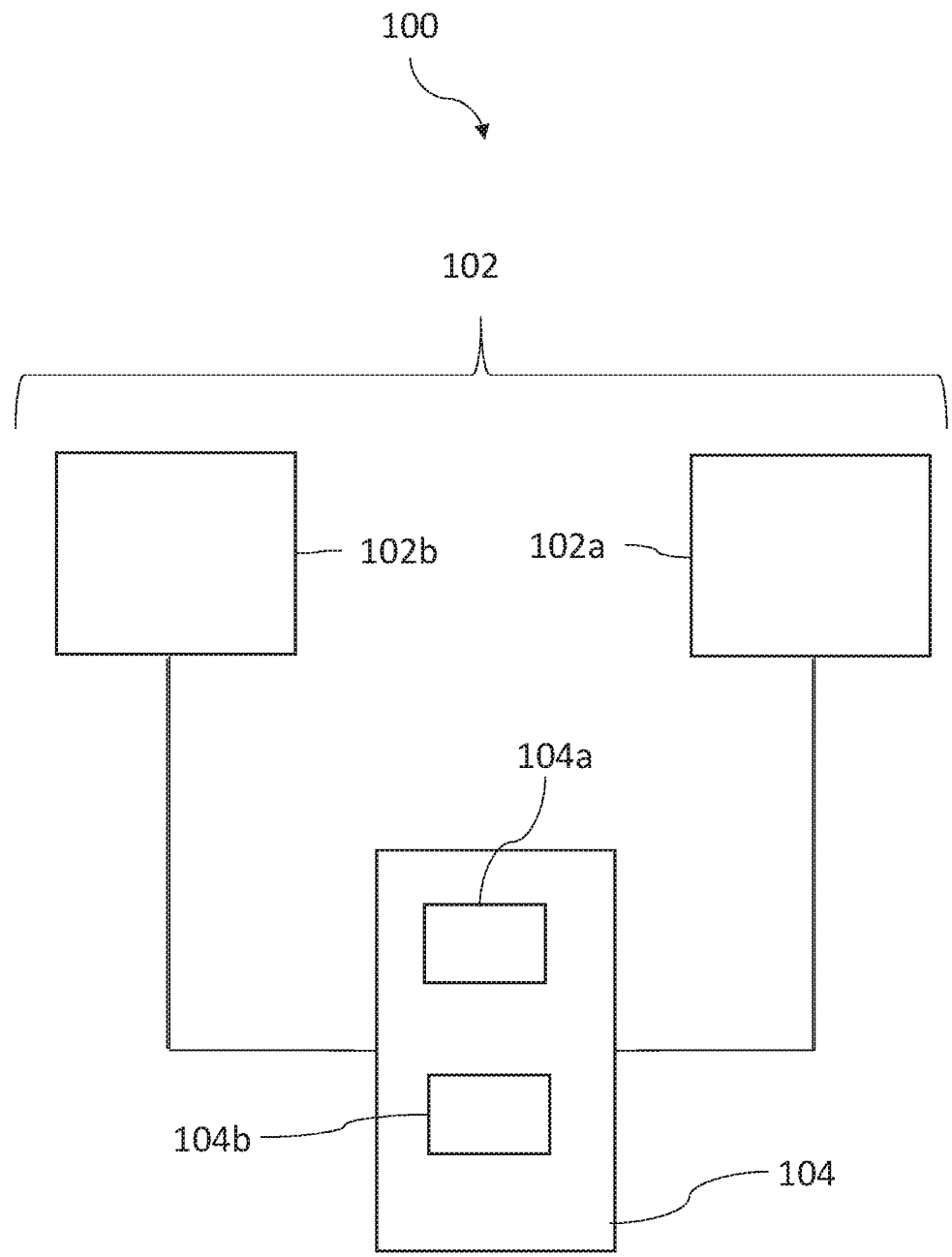
FIG. 1 schematically illustrates a material management apparatus according to an example.

FIG. 1 shows an example material management apparatus 100 for an additive manufacturing system. The material management apparatus 100 comprises build material supply system 102, which includes a first build material supply unit 102a (hereinafter "first supply unit 102a") and a second material supply unit 102b (hereinafter ("second supply unit 102b"). The material management apparatus 100 further comprises a controller 104 which is to control the build material supply system 102 to vary an amount of build material to be supplied via the first supply unit 102a based on a detected difference between a first amount of material available for supply via the first build material supply unit and a second amount of material available for supply via the second build material supply unit.

The controller 104 may comprise, for example, a programmable logic controller 104a, such as a microprocessor, forming a part of processing circuitry of the material management apparatus. The controller 104 may control the general operation of the material management apparatus 100 or may be dedicated to specific operations described herein. The controller 104 may be coupled to a memory 104b, which stores machine executable instructions. The memory 104b may comprise a Read Only Memory (ROM) and/or a Random Access Memory (RAM), for example. The programmable logic controller 104a may execute the instructions and hence perform methods in accordance with the present disclosure.

Figure 2A:
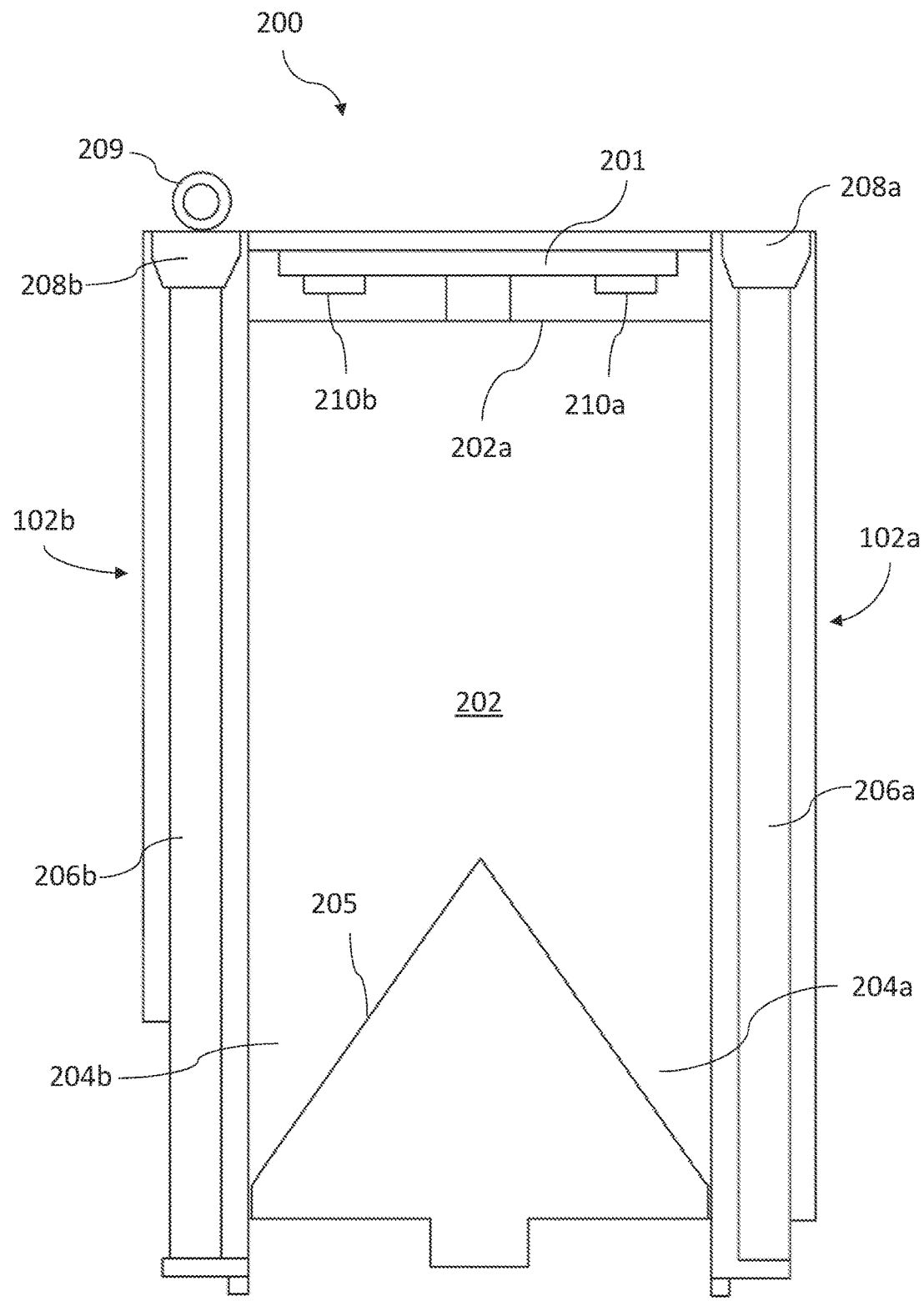
FIGS. 2a and 2b schematically illustrate an additive manufacturing system according to an example.
Figure 2B:
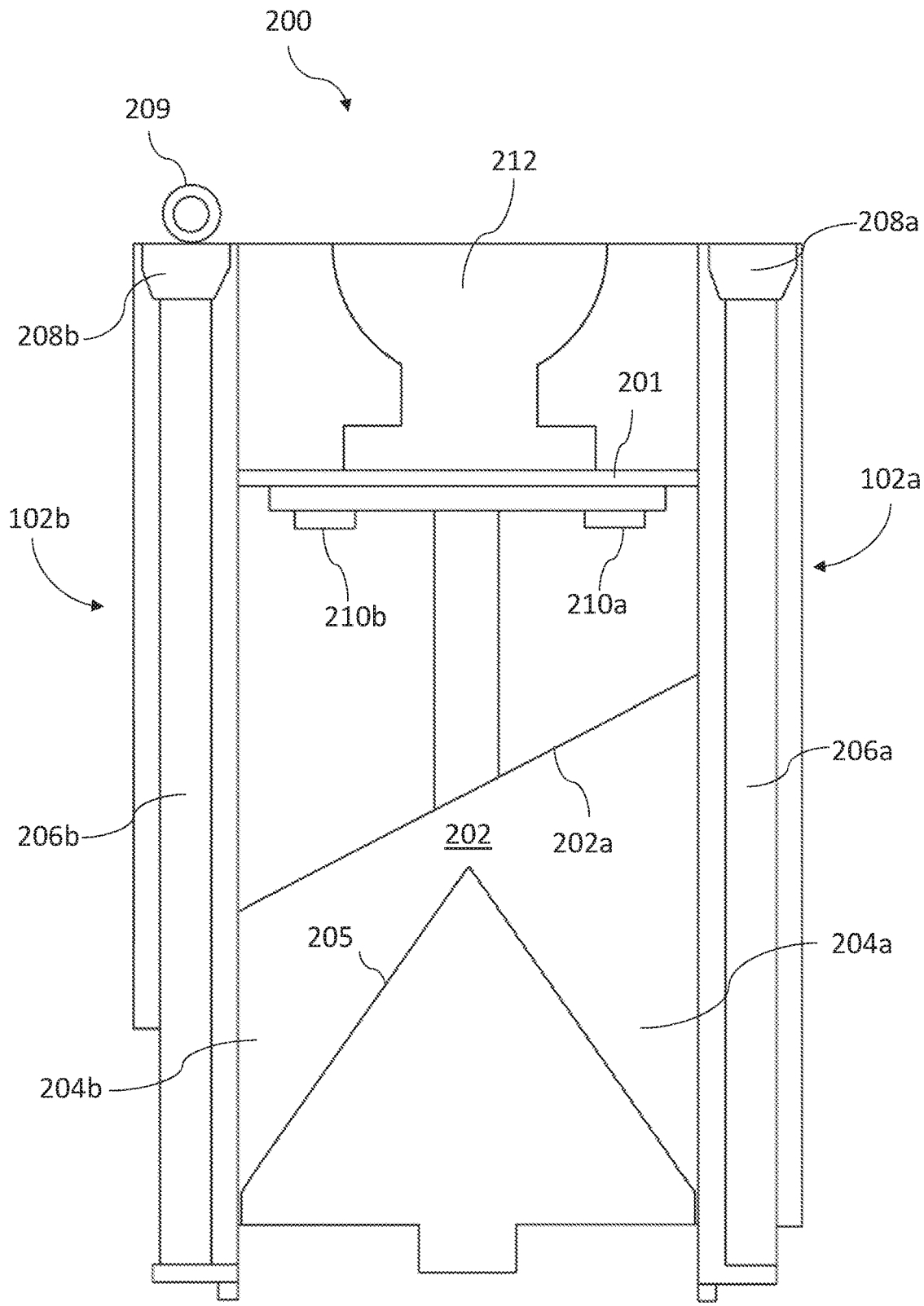

FIGS. 2a and 2b show an additive manufacturing system 200 in accordance with an example. The additive manufacturing system 200 comprises a material management apparatus 100 as described above, including a controller (not shown) and first and second supply units 102a, 102b as described above, and components of a 3D printer, for example. The material management apparatus 100, or part thereof, may be removably fitted to the 3D printer, for example. In some examples, the controller 104 described above is fixed to the 3D printer, and the build material supply system 102 is removably fitted to the 3D printer. The term "material management apparatus" used herein thus encompasses an apparatus which can be removably fitted as a whole to an additive manufacturing system, as well as an apparatus forming part of an additive manufacturing system, comprising components some or all of which may not be removably fitted to same, for example.

The additive manufacturing system 200 also comprises a building area, in the form of a platform 201, on which an object may be built by additive manufacturing. The first supply unit 102a supplies build material 202 to a first side of the platform 201 and the second supply unit 102b supplies build material to a second, opposing, side of the platform.

The additive manufacturing system 200 holds build material 202 in a first supply container 204a and a second supply container 204b connected to the first and second supply units 102a, 102b respectively. In the present example, the first and second supply containers 204a, 204b are separated in their respective lower parts by a protruding structure 205, but are joined in their upper parts. In other examples, there may be no such protrusion, so that the first and second supply containers 204a, 204b form a single container, or they may be completely separate.

The supply units 102a, 102b each include a respective transport mechanism 206a, 206b, via which, in use, build material 202 is transported to a respective holding area 208a, 208b. The transport mechanisms 206a, 206b in FIGS. 2a and 2b comprise Archimedes screw arrangements. In other examples different transport mechanisms 206a, 206b may be used, such as conveyor belts or pump mechanisms for example.

The additive manufacturing system 200 also includes a distributor 209 (which may be referred to as a "recoater") to distribute build material 202 on the platform 201 selectively from the first supply unit 102a and the second supply unit 102b. The distributor may include a sliding carriage holding a counter-rotating roller or blade, for example. The distributor 209 may distribute build material 202 alternately from the first supply unit 102a and the second supply unit 102b, for example. Example processes for distributing build material 202 are described below.

The additive manufacturing system 200 includes a detection system comprising a first sensor 210a and a second sensor 210b. In this example, the sensors 210a, 201b are located on the underside of the platform 201, but other arrangements may be used. The detection system is to detect a difference between an amount of build material 202 available to be supplied via the first supply unit 102a and an amount of build material 202 available to be supplied via the second supply unit 102b. The sensors 210a, 210b may each comprise a range sensor such as an optical sensor or ultrasound sensor for example. The first sensor 210a may sense a level of the build material 202 in the first supply container 204a and the second sensor 210b may sense a level of the build material in the second supply container 204b. The difference may be determined based on a comparison of these levels, for example. The amount of build material 202 that is detected may thus comprise a height of build material 202 in a supply container 204a, 204b.

FIG. 2a shows the additive manufacturing system 200 at the beginning of a printing process. The platform 201 is at or near the top of the system 200. Build material 202 is filled nearly to the top of the system, and the upper surface 202a of the build material 202 is substantially level. In operation the distributor 209 may distribute build material 202 from the supply units 102a, 102b to form successive layers of build material 202 on the platform 201. After each layer is formed, successive layers of an object are formed, for example by selectively hardening the build material using, for example, selective laser sintering or any other suitable technique. The platform 201 may be moved progressively downwards after the each layer has been formed so that the top of the object being formed is kept at substantially the same level.

FIG. 2b shows the additive manufacturing system 200 at an intermediate stage of the printing process in which the object 212 is partially formed. In this example, the upper surface 202a of the build material has become uneven. This could be due to, for example, each layer of build material 202 requiring different amounts of build material 202, uneven performance or calibration between the first supply unit 102a and the second supply unit 102b, for example.

Figure 3:
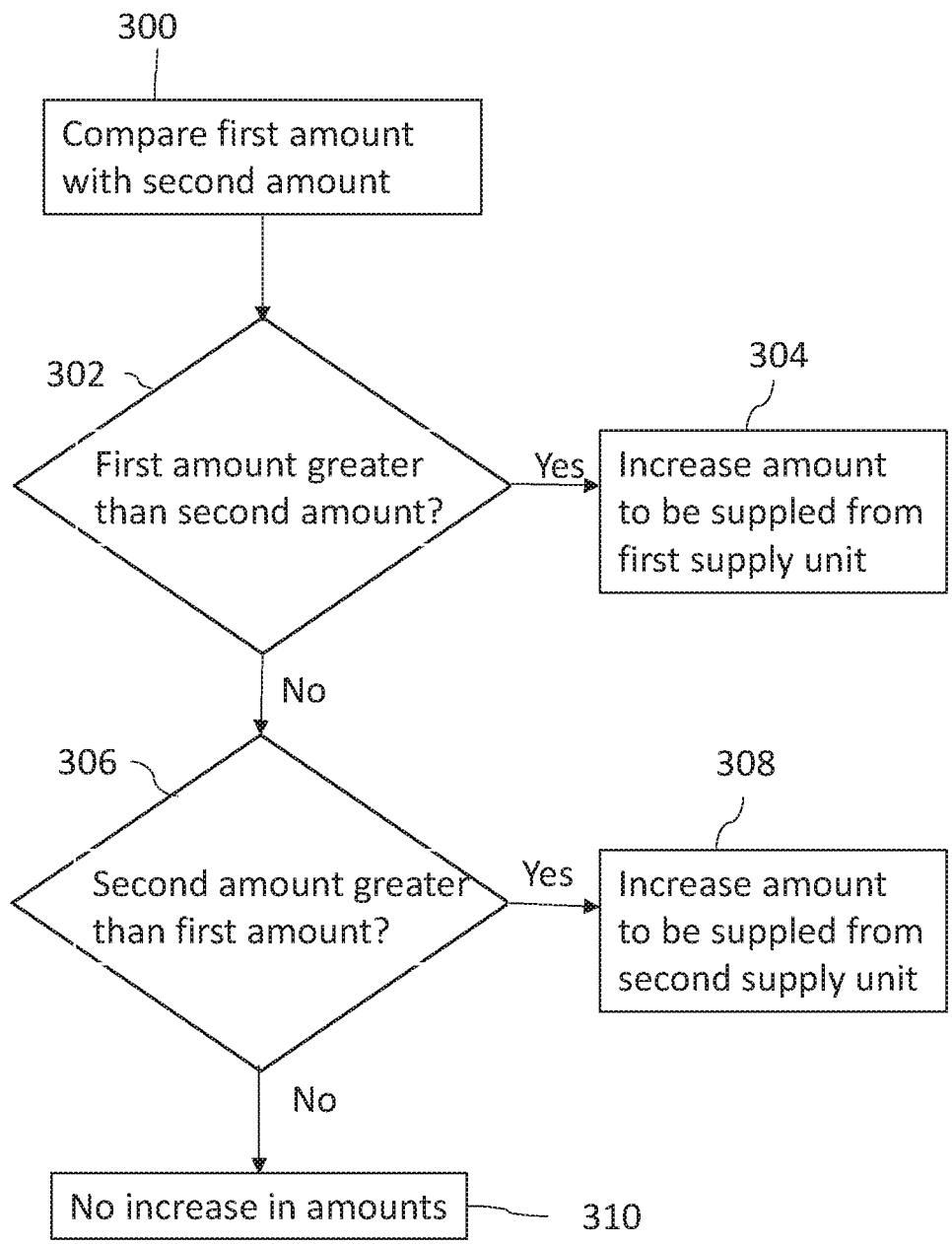
FIG. 3 is a flow chart illustrating a method according to an example.

FIG. 3 is a flow chart illustrating an example process performed by the controller 104 in controlling operation of the additive manufacturing system 200. At 300, the controller 104 performs a comparison of a first amount of build material 202 available for supply from the first supply unit 102a and a second amount of build material 202 available for supply from the second supply unit 102b. This comparison may be based from data from the detection system. For example, the first and second sensors 210a, 210b may provide data indicating a vertical (or substantially vertical) distance from the sensor to the upper surface 202a of the build material 202, thereby providing an indication of an amount of material remaining to be supplied to the first and second supply units 102a, 102b respectively.

At 302, the controller 104 determines whether the first amount is greater than the second amount. For example, if the data received from first sensor 210a indicates a shorter distance to the upper surface 202a of the build material 202 than the data received from the second sensor 210b, this may result in a determination that the first amount is greater than the second amount.

If the determination at 302 is that the first amount is greater than the second amount, the controller 104 increases an amount of build material 202 to be supplied from the first supply unit 102a at 304.

If the determination at 302 is that the first amount is not greater than the second amount, the controller 104 proceeds to 306. At 306, the controller 104 determines whether the second amount is greater than the first amount. For example, if the data received from second sensor 210b indicates a shorter distance to the upper surface 202a of the build material 202 than the data received from the first sensor 210a, this may result in a determination that the second amount is greater than the first amount.

If the determination at 306 is that the second amount is greater than the first amount, the controller 104 increases an amount of build material 202 to be supplied from the second supply unit 102b at 308.

If the determination at 306 is not that the second amount is greater than the first amount, the controller determines that no increase in amount is required at 310.

The process of FIG. 3 thus provides an example method by which the controller 104 may determine whether to selectively increase an amount of build material 202 to be supplied from the first supply unit 102a or the second supply unit 102b. Increasing the amount may result in excess material remaining after the distributor 109 forms a layer of material. Thus, if no difference is detected between the first and second amounts, the material management apparatus 100 may operate in a default mode in which little or no excess material is generated. If a difference is detected, the material management apparatus may operate in a rebalancing mode in which an increase amount of excess material is generated. As is described in more detail below, this excess material may be deposited in the opposite supply unit opposite to the one from which it originated e.g. increasing the amount of build material 202 from the first supply unit 102a may result in excess material being deposited in the second supply unit 102b. This enables uneven distribution of build material 202 between the first and second supply containers 204a, 204b to be redressed or ameliorated.

Multiple different rebalancing modes may be applied for a given supply unit 102a, 102b. For example, the rebalancing mode selected may be scaled to the size of the difference in amounts detected.

In the above example, it was described that the amount of build material 202 to be distributed from a supply unit 102a, 102b is varied in response to detecting a difference between amounts of build material available to be supplied from respective supply units 102a, 102b. In some examples, the amount to be supplied is varied in response to detecting any difference. In other examples, only differences of at least a threshold amount may result in any variation in an amount supplied from a supply unit 102a, 102b. In other words, when a difference is detected which is less than the threshold amount, the controller 104 operates as though no difference is detected. The threshold may be set to represent an acceptable level of difference, so that the amount to be supplied is not varied if the difference between the amounts of build material 202 available for supply via the first and second supply units 102a, 102b is within an acceptable range. Since in some examples some (perhaps very small) difference between the first and second amounts will almost always be detected, use of a threshold as described may prevent material from being repeatedly transported between the first and second supply units 102a, 102b.

The process of FIG. 3 may be repeated periodically. For example, as described above, the distributor 209 may distribute material alternately from the first and second supply units 102a, 102b, forming a distribution cycle. The process may be performed once per distribution cycle, once per a predetermined number of distribution cycles (so that default or rebalancing modes are set for multiple cycles, for example), once each time material is distributed from one or other of the first and second supply units 102a, 102b, or it may be performed continuously, for example.

FIGS. 4a to 5d show simplified side views of the first supply unit 102a, second supply unit 102b, platform 201 and distributor 209 according to example processes for controlling an amount of material to be distributed a supply unit 102a, 102b. The first supply unit 102a includes a rotatable vane 400 and a protruding part 402. While no equivalent or similar parts for the second supply unit 102b are shown in FIGS. 4a to 5d, it will be appreciated that the second supply unit may include equivalent or similar parts.

FIGS. 4a to 4f illustrate a first example sequence of operations to distribute build material according to a default mode as described above, and FIGS. 5a to 5d illustrate a second example sequence of operations to distribute build material according to a rebalancing mode as described above. In these examples, the vane 400 operates under control of the controller 104. The distributor 209 and/or other components may also operate under the control of the controller 104.

While in the examples of FIGS. 4a to 5d, the platform 201 is shown level with the top of the supply units 102a, 102b and a layer of build material 202 is formed directly on the platform, as described above, the platform 201 may move downwards as successive layers of build material 202 are formed. The processes for distributing build material 202 described here apply equally where the platform 201 is lowered, with a layer of build material 202 instead being formed over a previously formed layer.

Figure 4A:
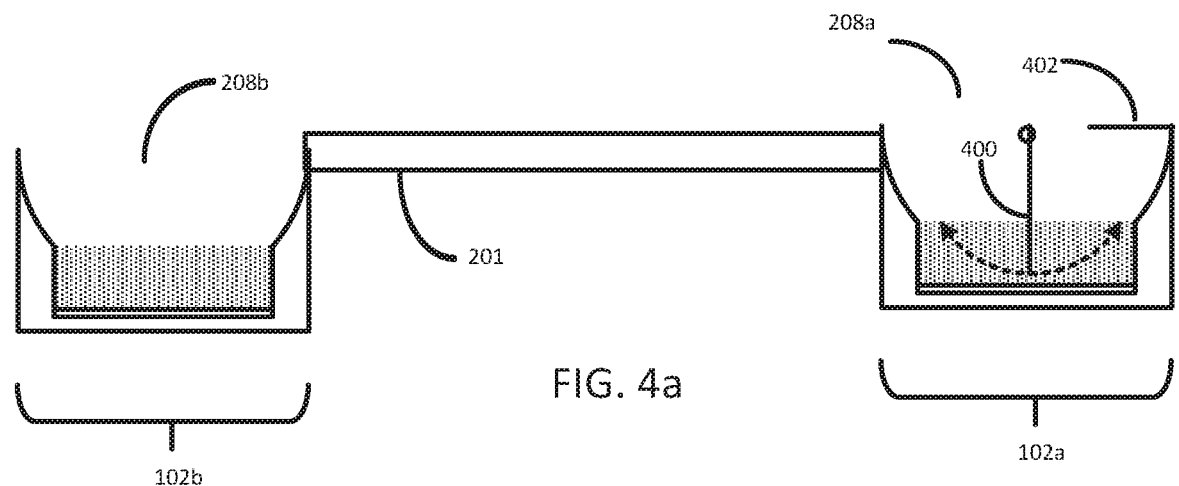
FIGS. 4a to 4f schematically illustrate components of the additive manufacturing apparatus performing operations in a first sequence to distribute build material.
Figure 4B:
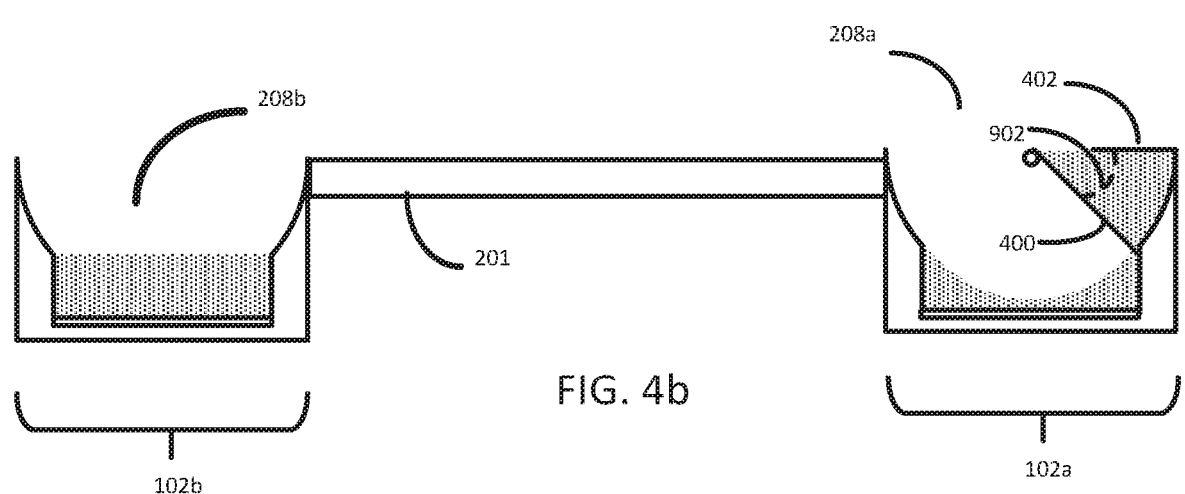

In the first example sequence, the first controller 104 controls the vane 400 to rotate towards the protruding part 402, as shown in FIG. 4b, to determine if there is sufficient build material in the holding area 208a of the supply module 102a. Some of the build material is scooped up by the vane 400 and compressed against the protruding part 402. The vane 400 becomes blocked by the scooped build material at an angular position below the protrusion 402. The controller 126 may determine the angular position at which the vane 400 becomes blocked, and thus determine whether a sufficient amount of build material (e.g. an amount equal to or greater than an amount to be distributed by the distributor 209) is held in the holding area 208a. If the amount is determined not to be sufficient, the additional build material may be supplied to the holding area 208a by the transport mechanism 206a. The vane 400 may then be rotated again towards the protruding part 402 and the resulting angular position again measured; this process may be repeated until it is determined that there is sufficient build material available in the holding area 208.

Figure 4C:
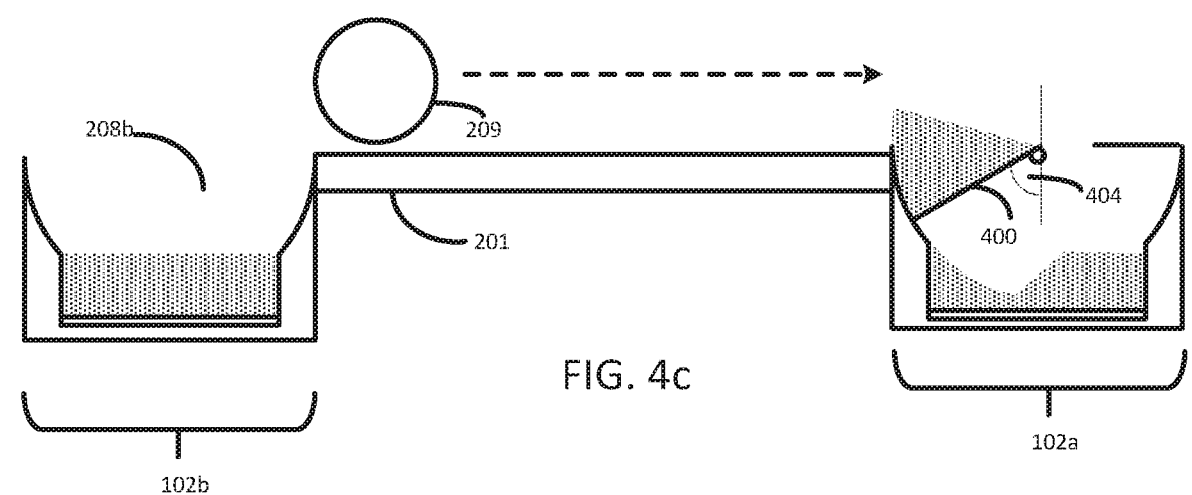
Figure 4D:
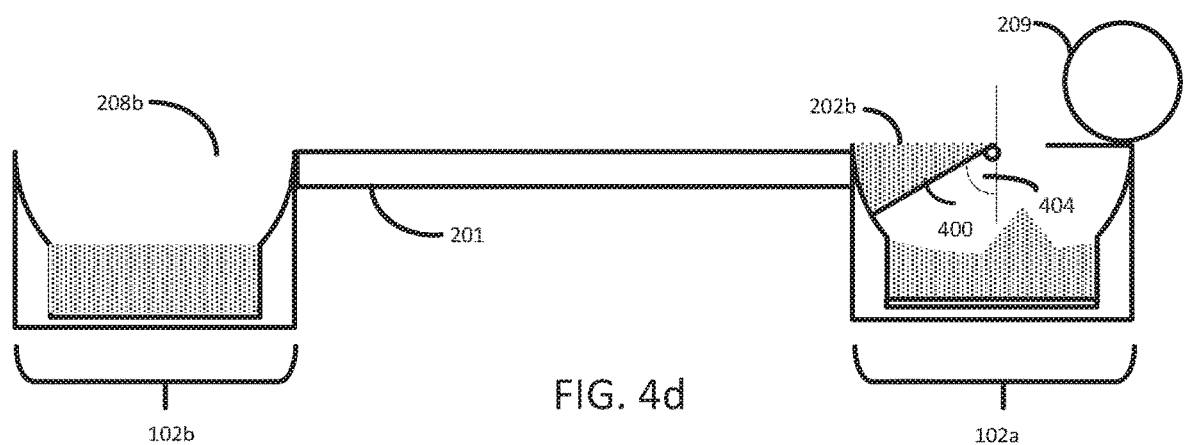

As shown in FIG. 4c, the vane 400 next rotates towards the platform 400, scooping up a quantity of build material as it does so, to a measuring position. A part of this quantity is raised above the level of the platform 104. The distributor 209 moves across the top of the supply unit 102b displacing part of the scooped up quantity of build material back into the holding area 208a, as shown in FIG. 4d. A portion 202b of build material is thus formed on the vane 400 having an upper surface substantially aligned with the upper surface of the platform 104. The size of the portion 202b depends on the angle 404 that the vane 400 makes with the vertical in the measuring position, as shown in FIGS. 4c and 4d; the smaller the angle 404, the larger the size of the portion 202b. Although herein we refer to the angle 404 with respect to the vertical, in some examples an angle with respect to the horizontal (or any other orientation) may instead be used.

Figure 4E:
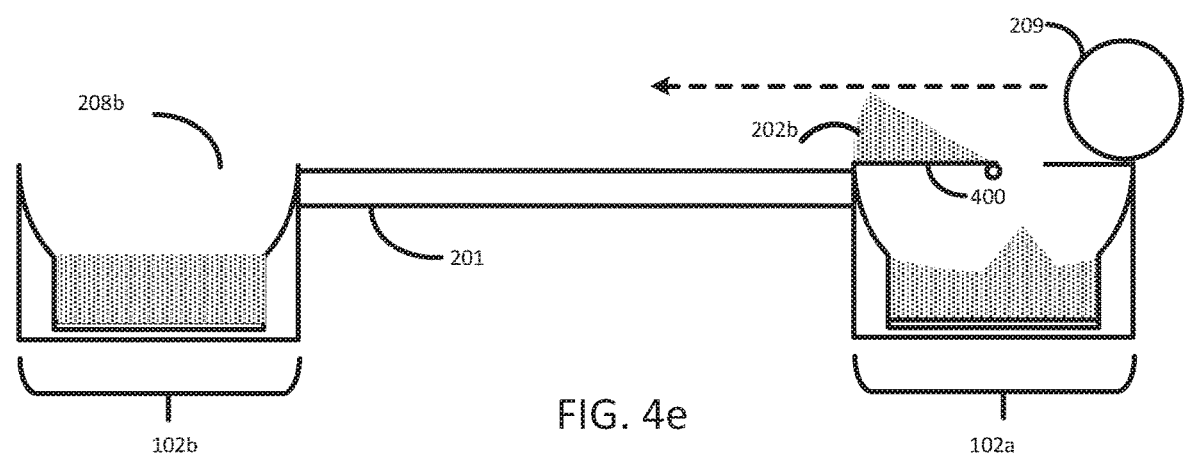
Figure 4F:
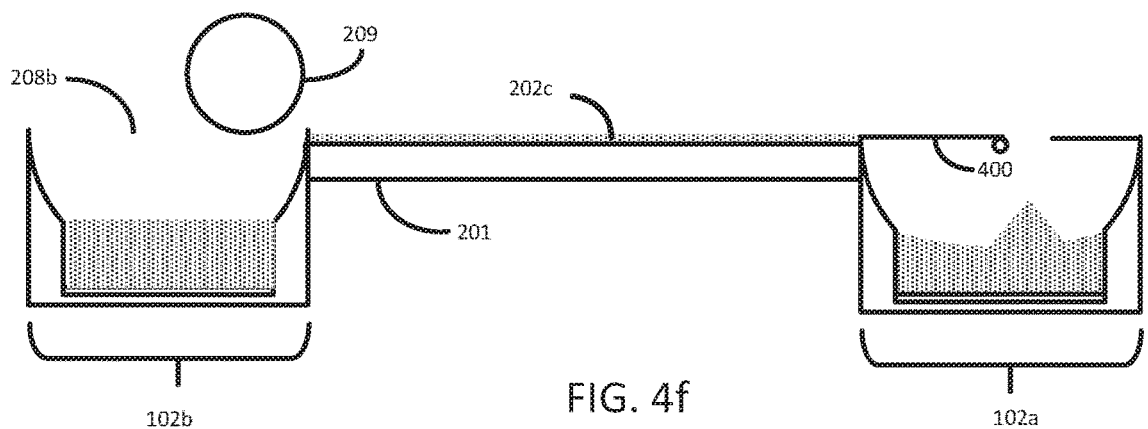

The portion 202b having been formed, vane 400 rotates further to a substantially horizontal configuration so that it is substantially aligned with the top surface of the platform 201, with the portion 202b held on the upper surface of the vane 400, as shown in FIG. 4e. The distributor 209 then moves across the top of the first supply unit 102a and across the platform 209, displacing the portion 202b as it does so, thereby forming a layer 202c of build material on the platform 201.

In the first example sequence, substantially all of the portion 202b is distributed on the platform 202c. The angle 404 is selected so as to form a portion 202b including an amount of build material substantially equal to the amount required to form the layer 202b. In the second example sequence, FIGS. 5a to 5d show a sequence of operations in which a larger portion 202b is formed, resulting in excess build material 202d being transported into the holding area 102b of the second supply unit 102b. FIGS. 5a to 5d illustrate operations corresponding to those of FIGS. 4c to 4f respectively. While, for conciseness, no operation corresponding to that illustrated in FIG. 4b to determine whether there is a sufficient amount of material in the holding area 208a has been included in the example sequence of FIGS. 5a to 5d, other examples may include this operation. In other examples, no operation corresponding to FIG. 4b is performed in either a default mode or a rebalancing mode of operation.

Figure 5A:
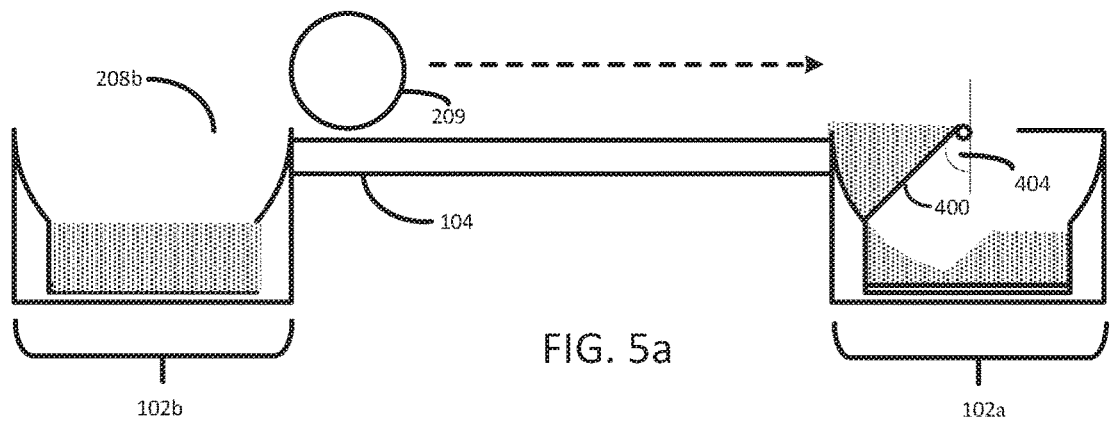
FIGS. 5a to 5d schematically illustrate components of the additive manufacturing apparatus performing operations in a second sequence to distribute build material.
Figure 5B:
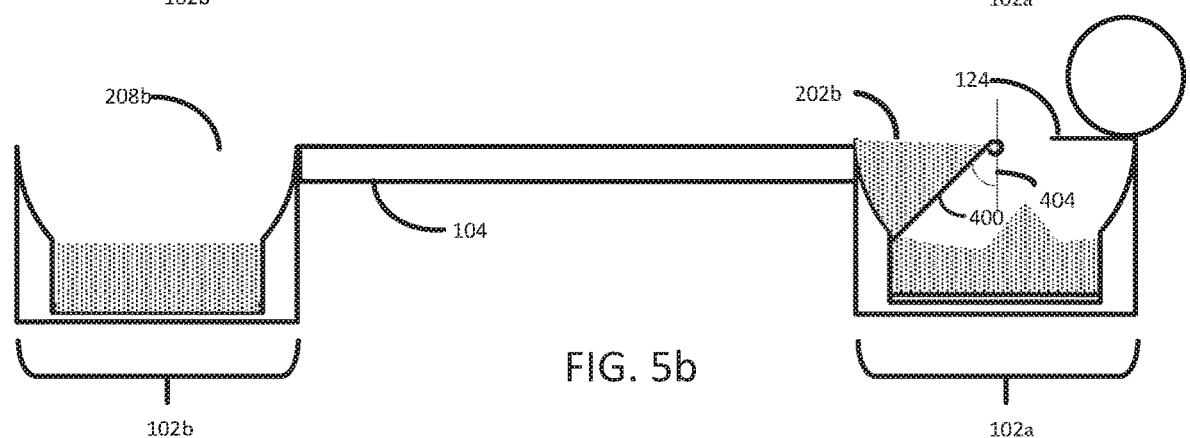
Figure 5C:
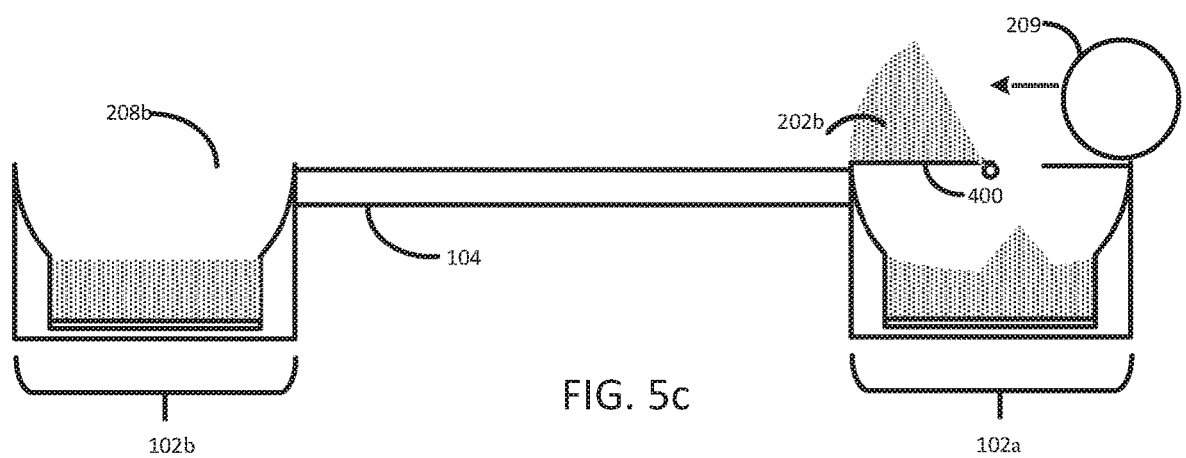
Figure 5D:
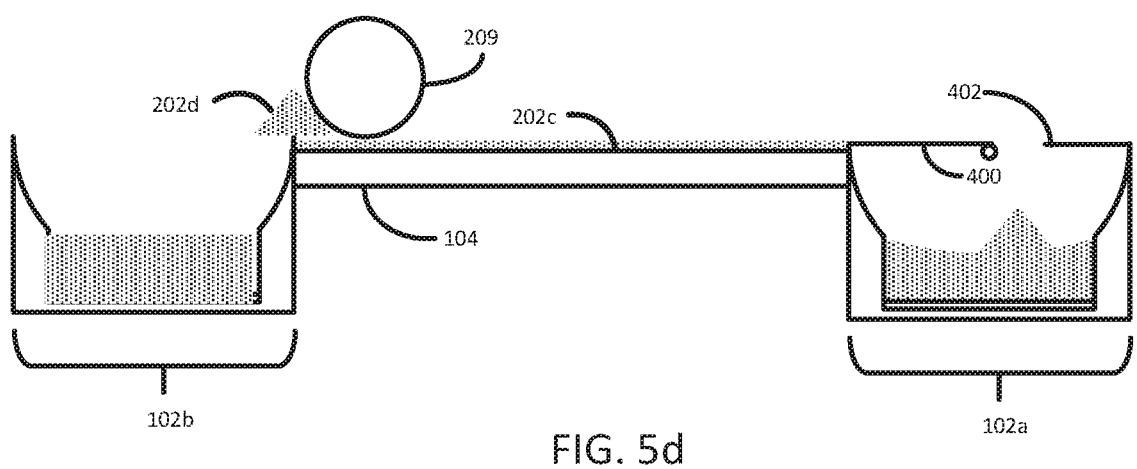

In the second example sequence, the angle 404 formed by the vane 400 with the vertical when it is in the measure position (see FIGS. 5a and 5b) is smaller than that formed in the first example sequence. This results in a larger portion 202b being formed. Accordingly, after the layer 202c of build material has been formed, as illustrated in FIG. 5d, excess build material 202d remains, and is deposited in the second supply unit 102b. This increases the amount of material available for supply via the second supply unit 102b.

The examples described with reference to FIGS. 4a to 5d illustrate examples of methods of controlling an amount of build material which is to be supplied from the first supply unit 102a. It will be appreciated that these methods may additionally or alternatively be used to control an amount of material to be supplied from the second supply unit 102b. Further, while in the examples of FIGS. 4a to 5d the size of the portion 202b was varied between two amounts, it will be appreciated that any number of sizes may be provided by varying the angle 404 that the vane 400 makes with the vertical when in the measuring position.

As mentioned above, by varying (modifying) the amount of build material supplied from the first and/or second supply units 102a, 102b, imbalances between an amount of material available for supply via the first supply unit 102a and an amount of material available for supply via the second supply unit 102b may be reduced. This may be desirable because such imbalances can create inefficiencies. For example, if one of the supply containers 204a, 204b becomes empty before the other, the system may require refilling more frequently than if both become empty at substantially the same time. In some cases, imbalances may cause one supply container 204a to become empty before a print job has reached completion; the examples described herein improve the efficiency of the volume used to store build material, since they ameliorate a requirement to build in a "safety volume" to take account of such issues.

In the above examples, it was described that the amount of material to be supplied is increased in response to detecting a difference between the amounts available via the first and second supply units 102a, 102b. However, other variations in the amount of material are also possible. For example, in the above examples, the default mode of operation is one which produces little or no excess material. This inhibits build material being unnecessarily transferred between the supply units 102a, 102b. However, in some examples an alternative default mode is adopted which generates a significant amount of excess material, with a decreased amount of build material being supplied from a supply unit 102a, 102b in the rebalancing mode. In this case, an amount of build material 202 to be supplied from e.g. the first supply unit 102a is decreased in response to determining that an amount of build material 202 available for supply from the first supply unit 102a is less than amount of build material available for supply from the second supply unit 102b.

In the above examples, a difference between an amount of build material 202 available for supply from the first supply unit 102a and an amount of build material 202 available for supply from the second supply unit 102b was detected based on input from two sensors 210a, 210b. In some examples, only one sensor may be used. For example, if the amount of build material 202 used to form each layer 202c is known, an amount of material held in e.g. the first supply container 204a as indicated by data from a sensor can be compared with an expected amount based on a number of layers 202c that have been formed from build material 202 supplied via the first supply unit 102a and the difference determined based on this comparison. In other examples, no sensor is required. For example, respective actions of the transport mechanisms 206a, 206b may be used to determine an amount of build material 202 supplied via the first and second supply units 102a, 102b respectively, and a difference determined based on this. For example, if a transport mechanism 206a, 206b comprises an Archimedes screw arrangement, the number of turns of the Archimedes screw may be used to determine an amount of build material 202 supplied.

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations. Claims reciting "a" or "an" with respect to a particular element contemplate incorporation of at least one such element, neither requiring nor excluding two or more such elements. Further, the terms "include" and "comprise" are used as open-ended transitions

What is claimed is:

1. A material management system for additive manufacturing, the material management system comprising:
   a build material supply system to supply build material to a build platform of an individual additive manufacturing apparatus for building an object by additive manufacturing, comprising:
      a first build material supply unit to supply build material to a first side of the build platform of the individual additive manufacturing apparatus; and
      a second build material supply unit to supply build material to a second side of the build platform of the individual additive manufacturing apparatus, the second side opposite the first side; and
   a controller configured to control the build material supply system to vary an amount of build material to be supplied to the build platform of the individual additive manufacturing apparatus via the first build material supply unit based on a detected difference between a first amount of material available for supply to the build platform of the individual additive manufacturing apparatus via the first build material supply unit and a second amount of material available for supply to the build platform of the individual additive manufacturing apparatus via the second build material supply unit.

2. The material management system of claim 1, wherein the controller is to increase an amount of build material to be supplied to the build platform of the individual additive manufacturing apparatus via the first build material supply unit in response to detecting that the first amount is higher than the second amount by at least a threshold amount.

3. The material management system of claim 1, wherein the build material supply system is to supply build material to the build platform of the individual additive manufacturing apparatus alternately from the first build material supply unit and the second build material supply unit.

4. The material management system of claim 1, comprising:
   a first supply container connected to the first build material supply unit; and
   a second supply container connected to the second build material supply unit, wherein the first amount comprises an amount of build material held in the first supply container and the second amount comprises an amount of build material held in the second supply container.

5. The material management system of claim 4, comprising a detection system to detect the difference between the first amount of build material and the second amount of build material.

6. The material management system of claim 5, wherein the detection system comprises a first sensor to sense an amount of material held in the first supply container and a second sensor to sense an amount of material held in the second supply container.

7. The material management system of claim 6, wherein each of the first sensor and the second sensor comprises a range sensor.

8. The material management system of claim 1, wherein each of the first build material supply unit and the second build material supply unit comprises a holding area and a vane rotatable in the holding area to move an amount of the build material above the respective first build material supply unit and second build material supply unit.

9. A method of supplying build material for additive manufacturing, comprising:
supplying build material to a build platform of an individual additive manufacturing apparatus selectively from a first side of the build platform of the individual additive manufacturing apparatus and a second side of the build platform of the individual additive manufacturing apparatus, the first side opposite the second side;
detecting a difference between a first amount of build material available to be supplied to the build platform of the individual additive manufacturing apparatus from the first side and a second amount of material available to be supplied to the build platform of the individual additive manufacturing apparatus from the second side; and
controlling an amount of build material to be supplied to the build platform of the individual additive manufacturing apparatus from the first side based on the detected difference.

10. The method of claim 9, comprising increasing an amount of build material to be supplied to the build platform of the individual additive manufacturing apparatus from the first side in response to the detection system detecting that the first amount is higher than the second amount.

11. The method of claim 9, comprising controlling a distributor to distribute build material on the build platform of the individual additive manufacturing apparatus, selectively from the first side and the second side, so as to form a layer of build material on the build platform of the individual additive manufacturing apparatus.

12. The method of claim 11, wherein the additive manufacturing system comprises:
a first build material supply unit for supplying build material to the build platform of the individual additive manufacturing apparatus from the first side; and
a second build material supply unit for supplying build material to the build platform of the individual additive manufacturing apparatus from the second side; and
wherein the method comprises depositing excess build material, after forming the layer of build material from build material supplied to the build platform of the individual additive manufacturing apparatus from the first build material supply unit, in the second build material supply unit.

13. A non-transitory computer-readable storage medium comprising computer-executable instructions which, when executed by a processor, cause a material management system for additive manufacturing to perform a method, the method comprising:
performing a comparison of a first amount of build material available for supply from a first build material supply unit at a first side of a build platform of an individual additive manufacturing apparatus with a second amount of build material available for supply from a second build material supply unit at a second side of the build platform of the individual additive manufacturing apparatus opposite the first side; and
based on the comparison, varying an amount of build material to be supplied from the first side of the build platform of the individual additive manufacturing apparatus by the first build material supply unit.

14. The non-transitory computer-readable storage medium of claim 13, wherein the method comprises increasing an amount of build material to be supplied from the first side of the build platform of the individual additive manufacturing apparatus by the first build material supply unit in the case that the first amount is greater than the second amount.

15. The non-transitory computer-readable storage medium of claim 13, wherein the method comprises controlling a distributor to distribute build material from the first build material supply unit to form a layer of build material on the build platform of the individual additive manufacturing apparatus and to deposit excess build material in the second build material supply unit at the second side of the build platform of the individual additive manufacturing apparatus.

* * * * *